April 5, 1966   R. P. CAHN   3,244,763
SEMI-PERMEABLE MEMBRANE EXTRACTION
Filed Dec. 29, 1960

Robert P. Cahn   Inventor

By   Richard H. Nagel

Patent Attorney

United States Patent Office 3,244,763
Patented Apr. 5, 1966

3,244,763
SEMI-PERMEABLE MEMBRANE EXTRACTION
Robert P. Cahn, Millburn, N.J., assignor to Esso Research and Engineering Company, a corporation of Delaware
Filed Dec. 29, 1960, Ser. No. 79,270
6 Claims. (Cl. 260—677)

The present invention relates to a method and apparatus for removing from a fluid mixture one or several components thereof. More particularly, the invention relates to a method and apparatus for removing a desired component from a mixture by the use of a selective solvent and recovering said desired component from the selective solvent. More specifically, the invention relates to the use of a porous, absorbent barrier containing selective solvent to recover from a fluid mixture a certain component or components contained therein.

In the past, two general methods, aside from absorption, distillation, crystallization, and selective adsorption, have been employed to segregate a desired component or components from a fluid mixture of components. The first method is that of extraction wherein the fluid mixture is contacted with an immiscible, selective solvent, i.e., one which selectively extracts a particular component or components from the mixture. The selective solvent is separated from the mixture, usually by settling, and the desired component subsequently separated from the selective solvent by distillation. Also it has been known to separate the desired component from the selective solvent by contacting the latter with a liquid which will extract the desired component from the selective solvent. This liquid will also be immiscible with the selective solvent and thus may be separated therefrom by settling. This type of re-extraction is usually desired when separation of the desired component and the selective solvent by distillation is not easily achieved.

Another method to effect a separation of a desired component from a mixture is by the use of a diffusion barrier, i.e., a non-porous or porous membrane. A selective non-porous membrane will permit the desired component to permeate therethrough because of the spacing and chemical type of the molecules in the membrane and yet prevent other components from effecting this passage because their molecules are too large, or chemically different, to permeate the non-porous membrane. On the other hand, in a porous membrane, separation of the components of a mixture is effected by the different rate of diffusion, usually due to differences in molecular weight of the materials to be separated. The mixture may be in liquid or vapor phase and ordinarily a vacuum or lower pressure will be maintained on the non-contacting side of the membrane to assist the movement of molecules of desired component through the membrane.

Although both of these methods are forward strides in separation techniques, they have disadvantages. In the selective extraction method, the disadvantage lies principally in the necessity of separating the mixture and selective solvent and, likewise, the selective solvent and the liquid employed to extract the desired component from the selective solvent, if such is used. Also, it is necessary to handle, and frequently heat and cool, large volumes of the selective solvent, which may be very corrosive. It would obviously be advantageous if the same results could be obtained without these solvent handling steps.

The difficulty in a gaseous diffusion separation is that segregation is effected only very slowly and is very power consuming and expensive. The rate of diffusion through a suitable porous membrane is very slow and inefficient (small increases in concentration per stage) even with the assistance of a vacuum on the non-contacting side. Therefore, it is desirable to effect a separation of the desired component from a mixture at greater efficiency and faster rates, ones which are independent of the gaseous diffusion rate. In the case of non-porous membranes, i.e. by using semi-permeable membranes, it is usually difficult to find a material for the membrane construction which will effect the desired separation. Only in very specific instances can a suitable resin, parchment, rubber or the like be found which will exhibit this phenomenon of "semi-permeability."

It is an object of this invention to provide a method and apparatus for separating a desired component from a mixture of components.

It is a further object of the instant invention to provide a one-vessel apparatus system wherein a desired component may be segregated from a mixture by a selective solvent and recovered from said selective solvent.

Briefly, the above objects are accomplished by contacting a mixture containing the desired component with a porous, absorbent barrier containing a selective solvent immiscible with said mixture. The more specific application of the instant invention is contacting a mixture containing the desired component with one side of a porous, absorbent barrier containing a selective solvent immiscible with said mixture while contacting the other side of said porous, absorbent barrier with a fluid which is immiscible with said selective solvent and will leach the desired component from the selective solvent.

The apparatus of the instant invention generally comprises a tank or pipe, which may be open or closed, having a porous, absorbent barrier therein which forms within said tank or pipe two zones, each of which has means to introduce and withdraw appropriate fluid therefrom.

The invention, its objects and its advantages will be more readily understood from the detailed discussion which follows.

Figure 1:
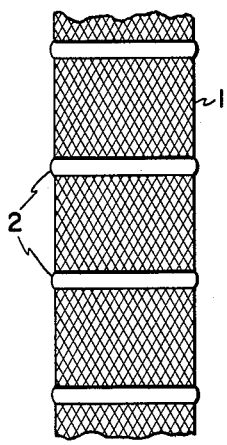
FIGURE 1 is a fragmentary, magnified cross-sectional side view of a porous, absorbent barrier containing absorbed selective solvent.

The significance and theory of the instant invention will best be understood if it is first discussed in terms of hypotheticals. Assume that it is desired to remove the A component from a mixture of A and B. Assume also that C will selectively dissolve A from a mixture of A and B, i.e., C is a selective solvent for A's removal, and is immiscible with the mixture. In accordance with the instant invention, a porous, absorbent barrier, which will be discussed in more detail hereinafter, is soaked with selective solvent C. FIGURE 1 illustrates a fragmentary, magnified cross-sectional view of such a porous, absorbent barrier 1 soaked with selective solvent 2. Though the drawing exaggerates the straightness of the capillaries, pores or spaces in a porous, absorbent barrier, the figure is illustrative of the fact that the absorbed selective solvent will afford "paths" from one side of the porous, absorbent barrier to the other side. In accordance with the instant invention, the mixture A and B is then contacted with the barrier. This results in component A being selectively extracted by the solvent and decreasing the amount of A in the mixture. When the selective solvent on the barrier absorbs its capacity of component A, the contacting is discontinued, the solvent removed from the barrier by air blowing, etc., and the barrier resoaked with fresh selective solvent. The barrier may then be reused to selectively remove A from the mixture.

However, as it is generally preferred to operate continuously without having to replace the spent selective solvent with fresh selective solvent, it is preferred to contact one side of the barrier with the mixture and the other side with a fluid which will leach from the selective solvent C the component A absorbed thereby. The latter fluid will be referred to as the re-extraction fluid and it must also be immiscible with the selective solvent. In these situations there will thus be a continuous transfer of component A from the mixture through the selective solvent C absorbed in the porous, absorbent barrier to the re-extraction fluid. The absorbed selective solvent and the barrier prevent the mixture and re-extraction fluid from contacting one another, as long as pressures are sufficiently equalized on both sides of the barrier to prevent a "blow out" through a capillary of the barrier. Subsequently component A may be separated from the re-extraction fluid by distillation or other suitable means, if necessary.

The mixture and the re-extraction fluid may move in the same or opposite directions to each other on their respective sides of the membrane. Countercurrent flow, in general, is preferred, but flow may be co-current in each stage, but countercurrent overall in a multistage apparatus.

Figure 2:
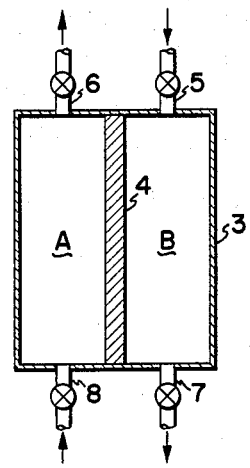
FIGURE 2 is a top view of an open vessel or tank system wherein the removal of a component from a mixture may be performed.

As a practical application of the generic concept of the instant invention, the recovery of isobutylene from a stream of 20 mole percent i-$C_4$=, 40 mole percent n-$C_4$=, 40 mole percent i-$C_4$ and n-$C_4$ is illustrative. Such a stream is commonly found in oil refineries as a result of thermal or catalytic cracking of naphthas or gas oils for the production of chemicals and gasoline components. The immiscible selective solvent for such a system is a 60–65 weight percent $H_2SO_4$ solution, and the re-extraction fluid may be a saturated hydrocarbon of sufficiently higher boiling point than isobutylene to allow easy separation of the two by distillation. A suitable material is hexane. Referring to FIGURE 2, the porous, absorbent barrier 4 composed of a suitable absorbent material such as paper or asbestos and the like is soaked with the selective solvent, the $H_2SO_4$ solution. The barrier is then placed in tank 3 to form zones A and B. The process is then initiated. The mixture of isobutylene and other $C_4$ hydrocarbons enters vessel 3 and zone B thereof by means of line 5 and flows therethrough contacting the porous, absorbent barrier 4 in its travel toward outlet 7. Zone B, formed by the barrier 4 and wall of vessel 3, is a trough-like zone through which the mixture of isobutylene and other $C_4$ hydrocarbons passes toward outlet 7. During its passage through the trough-like zone B the mixture contacts the barrier 4 containing absorbed $H_2SO_4$ solution which extracts from the mixture the isobutylene.

Simultaneously the other side of barrier 4 is being contacted with a re-extraction solvent, hexane, which has entered zone A of vessel 3 via line 8 and which exits therefrom via line 6. Zone A is similar geometrically to zone B.

In this particular system as illustrated in FIGURE 2, the re-extraction fluid likewise flows through a trough-like zone. During its travel therethrough, the hexane leaches from the $H_2SO_4$ solution in barrier 4 the isobutylene which has been absorbed thereby. Thus as the mixture of isobutylene and other hydrocarbons is passed through vessel 3 it loses a substantial portion of its isobutylene, while on the other hand the hexane as it passes through vessel 3 will pick up substantial quantities of the isobutylene which has been passed through the porous barrier by transmission through the medium of the $H_2SO_4$ solution.

As the $H_2SO_4$ solution is immiscible with both the feed and hexane, there will be little, if any, loss of the selective solvent during the process. Thus one may operate this process continuously without recharging or "re-filling" the porous, absorbent barrier 4. However, it may be desirable to continuously or intermittently add a small amount of $H_2SO_4$ solution to the membrane, either by a spray arrangement, or by injection of make-up acid into the $C_4$ or $C_6$ feeds to their respective chamber.

Vessel 3 may be a pipe or a similar cylindrically-shaped vessel. In such cases the porous, absorbent barrier may be cylindrically-shaped also and form with the interior walls of said vessel an annular-shaped zone, or a multiplicity of such cylindrical barriers may be inserted in a single vessel similar to conventional shell-and-tube heat exchangers. The mixture may flow through the interior of the cylindrically-shaped barrier while the re-extraction fluid flows through the annular zone or vice versa as desired. Suitable piping to said vessel is provided to permit the introduction and withdrawal of the proper fluids through the interior zone and the annular zone.

Figure 3:
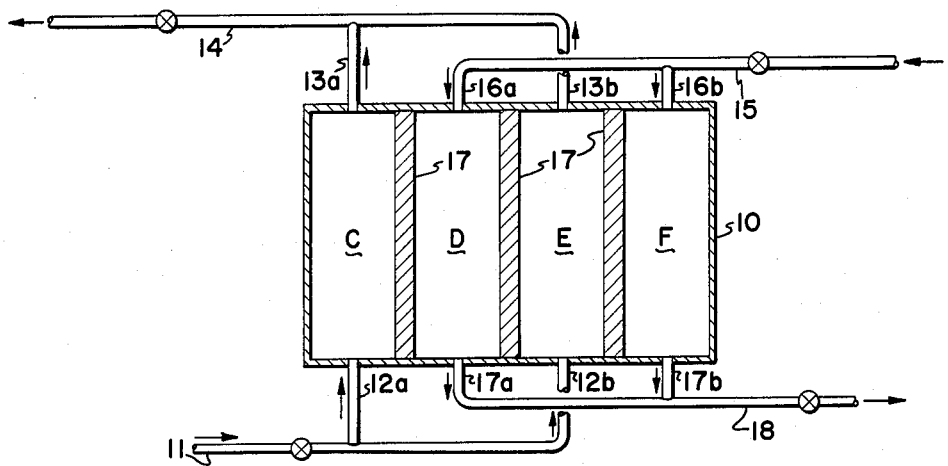
FIGURE 3 is a side view of a preferred embodiment of apparatus wherein the removal of a component from a mixture may be performed.

Referring to FIGURE 3, there is embodied a preferred form of the instant invention wherein the feed may be contacted with a plurality of porous, absorbent barriers to further enhance the removal of isobutylene from a mixture of isobutylene and other $C_4$ hydrocarbons. In this embodiment the mixture enters closed vessel 10 by means of line 11, which splits up into lines 12a and 12b, and passes upwardly through zones C and E formed between the walls of zone 10 and barriers 17. In its pass upwardly through the zones the isobutylene is removed from the mixture by contact with the $H_2SO_4$ solution absorbed on the porous barriers 17. The resultant extracted mixture is removed from vessel 10 via lines 13a and 13b to line 14.

Likewise, on the other side of the various barriers hexane continuously removes the isobutylene from the selective solvent. The re-extraction solvent is introduced into zones D and F of vessel 10 via line 15, which splits into lines 16a and 16b, and is withdrawn therefrom via lines 17a and 17b joined to line 18. Zones D and F are formed by the walls of vessel 10 and barriers 17. During its passage through vessel 10, the re-extraction solvent is continuously contacted with the "receiving" side of the barrier and thus continually extracts or leaches from the selective solvent on the barrier the isobutylene which has been absorbed thereby. This continues until the re-extraction solvent is finally withdrawn from vessel 10 by means of lines 17a and 17b, whereafter it may be directed to a distillation zone or other suitable means to effect a separation of the recovered isobutylene and the hexane re-extraction solution, if necessary.

In the specific embodiments discussed above wherein isobutylene is being extracted from a mixture containing normal butylene, isobutane and normal butane, it will be suitable to operate these processes disclosed at a temperature within the range of about 0 to 150° F., preferably 32 to 90° F. The pressure of the system is not critical to the process; however, it is necessary that the pressure on both sides of the barrier be maintained such that the pressure differential is insufficient to cause a transfer of the re-extraction solution through the barrier and into the mixture or vice versa.

It will be obvious that the instant invention may be employed to remove from a mixture any constituent for which there is selective solvent immiscible with the mixture. Thus it is apparent that this invention has applicability to a wide variety of materials. For example, mercaptans may be removed from a hydrocarbon stream by employing as the selective solvent a caustic solution.

Also, methyl butenes can be separated from other $C_5$ hydrocarbons, both saturated and unsaturated, using 65% $H_2SO_4$ as the selective solvent and a hydrocarbon from the class of $C_6$–$C_9$ paraffins as re-extraction solvent.

Likewise, aromatics may be removed from an aromatic-paraffin mixture by employing as the selective solvent an aqueous solution of diethylene glycol (Udex). Water or an aqueous solution of copper or silver salts may be employed as the selective solvent to remove acetylenic compounds or butadiene from a $C_4$ hydrocarbon-$C_4$ acetylene mixture. In the instances discussed above, the aqueous solution is absorbed on the membrane. On the other hand, the process may be used to remove valuable constituents or to remove desired constituents from aqueous solutions. In such cases, the hydrocarbon or similar immiscible solvents, which are employed as the selective solvents, are soaked in the barrier. Illustrations of such a system would be the recovery of phenol from waste water, such as found in a refinery effluent system and the recovery of certain organic materials from large paper mill waste effluent streams. Additionally, olefins may be recovered from a paraffin-olefin mixture by the use of sulfuric acid or benzene sulfonic acids as the selective solvent.

As has been discussed hereinabove, the porous, absorbent barrier will merely require sufficient strength to resist the contacting of the flowing liquids on each side, if the pressures are equal on both sides of the barrier. If there exists a pressure differential, which must be less than that which would result in comingling of the mixture and re-extraction solvent, the barrier must have sufficient mechanical strength to withstand it. It is therefore preferred that the barrier be reinforced by some metallic element.

Figure 4:
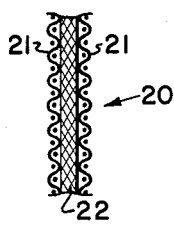
FIGURE 4 illustrates a porous, absorbent barrier which may be employed in the instant invention.

Referring to FIGURE 4, there is shown one embodiment of a suitable porous, absorbent barrier 20 which may be employed in the instant invention. The porous material 22 is sandwiched between two metallic elements 21, which are fastened by means of clamps, bolts, etc. The porous material may be paper asbestos, natural or synthetic fabrics, or felts, glass, mineral wool, natural or synthetic sponges, or sintered materials, such as plastics, ceramics or metals. The metallic elements 21 may be a metallic screen consisting either of a woven fabric of metallic or synthetic resin-type wires, ranging in size from 1–100 mesh, or of a metallic plate (for flat separation membranes) or pipe (for tubular membranes) with suitable sieve-type openings.

Figure 5:
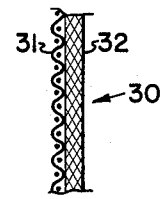
FIGURE 5 illustrates an embodiment of the porous, absorbent barrier which may be employed in the instant invention.

FIGURE 5 represents another porous, absorbent barrier 30 comprising a metallic element 31 and porous material 32. Element 31 is similar in all respects to element 21 discussed above and element 32 is similar in all respects to element 22 discussed above. Elements 31 and 30 may be fastened by clamps, bolts, etc., this not embracing the inventive aspects of the instant invention.

Figure 6:
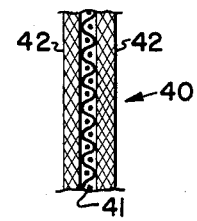
FIGURE 6 illustrates another embodiment of the porous, absorbent barrier which may be employed in the instant invention.

FIGURE 6 illustrates another embodiment of a porous, absorbent barrier 40 suitable for the instant invention. Barrier 40 has a metallic element 41 sandwiched between two porous, absorbent elements 42. Elements 41 and 42 are similar in all respects to elements 21 and 22, respectively, and may be fastened in any manner discussed above.

Although the instant invention has been discussed primarily with regard to employing a liquid re-extraction material to remove the constituents extracted by the selective solvent, it will be obvious that a gas may be employed to effect this same result. However, liquid re-extraction is preferred, as a vapor system would require sweep gas or a vacuum system to continually remove the desired constituents permeating through the barrier via the selective solvent. For some systems, the use of a sweep gas would require higher temperatures and additionally would impose more difficult pressure equalization and product recovery problems in comparison to the employment of a liquid re-extraction material. By the same token, however, the invention can be applied to the separation of gaseous mixtures by the use of a membrane soaked with a solvent selective for the material to be separated. Thus, carbon dioxide or hydrogen sulfide can be removed from a gas stream by the use of a membrane soaked with aqueous monoethanol-amine or diethanol-amine. In that case, the re-extraction solvent would preferably be a gas such as air, or a gas in which the presence of the carbon dioxide would not be objectionable.

The instant invention is not to be limited to the specific examples discussed hereinabove. The scope of the instant inveniton is to be determined by the appended claims.

What is claimed is:
1. A process for continuously removing a component from a mixture containing said component which comprises continuously passing said mixture over one side of a porous, absorbent barrier containing absorbed solvent selective to said component, said solvent being immiscible with said mixture, while continuously passing over the other side of said porous, absorbent barrier a fluid capable of leaching said desired component from said solvent, said fluid being immiscible with said solvent, and maintaining sufficient solvent absorbed in the barrier to prevent direct contact between the mixture on one side and the leaching fluid on the other.

2. A process for continuously removing isobutylene from a mixture containing isobutylene and saturated and olefinic $C_4$ hydrocarbons which comprises continuously contacting said mixture with one side of a porous adsorbent barrier containing adsorbed therein solvent which includes sulfuric acid selective to said isobutylene, said solvent being immiscible with said mixture while continuously contacting the other side of said porous adsorbent barrier with hexane which leaches said isobutylene from said solvent, and maintain sufficient solvent absorbed in the barrier to effectively prevent direct contact between said mixture and said hexane, said hexane being immiscible with said solvent.

3. A process for removing a fluid component from a fluid mixture which comprises passing said mixture over one face of a porous barrier having opposite faces, said barrier being substantially saturated with a liquid which is immiscible with said mixture as a whole but selectively solvent to said component, and simultaneously passing over the opposite face of said barrier a re-extractant fluid which is immiscible with the liquid in the barrier but capable of extracting said component therefrom.

4. The process of claim 3 wherein said component is isobutylene, said mixture is a $C_4$-cut containing isobutylene and saturated and olefinic $C_4$ hydrocarbons and wherein said mixture includes sulfuric acid and said re-extractant fluid is hexane.

5. The process of claim 3 wherein said mixture contains methyl butene and saturated and unsaturated $C_5$ hydrocarbons, the liquid comprises sulfuric acid, and said component is methyl butene.

6. The process of claim 3 wherein said mixture contains methyl butene and saturated and unsaturated $C_5$ hydrocarbons, said component is methyl butene, said liquid comprises sulfuric acid and said re-extractant fluid is a hydrocarbon selected from the group consisting of $C_6$–$C_9$ paraffins.

References Cited by the Examiner

UNITED STATES PATENTS

| | | | |
|---|---|---|---|
| 2,263,102 | 11/1941 | Proell | 208—278 |
| 2,509,885 | 5/1950 | Rupp et al. | 260—677 |
| 2,736,756 | 2/1956 | Elgin | 260—677 |
| 2,924,630 | 2/1960 | Fleck et al. | 260—676 |
| 2,947,687 | 8/1960 | Lee | 260—674 X |
| 2,958,715 | 11/1960 | Sanford et al. | |
| 2,960,462 | 11/1960 | Lee et al. | 208—308 |

FOREIGN PATENTS 462,558   3/1937   Great Britain.

ALPHONSO D. SULLIVAN, *Primary Examiner.*